(No Model.) 2 Sheets—Sheet 1.
S. B. GOFF.
WATER WHEEL OR MOTOR.
No. 426,262. Patented Apr. 22, 1890.
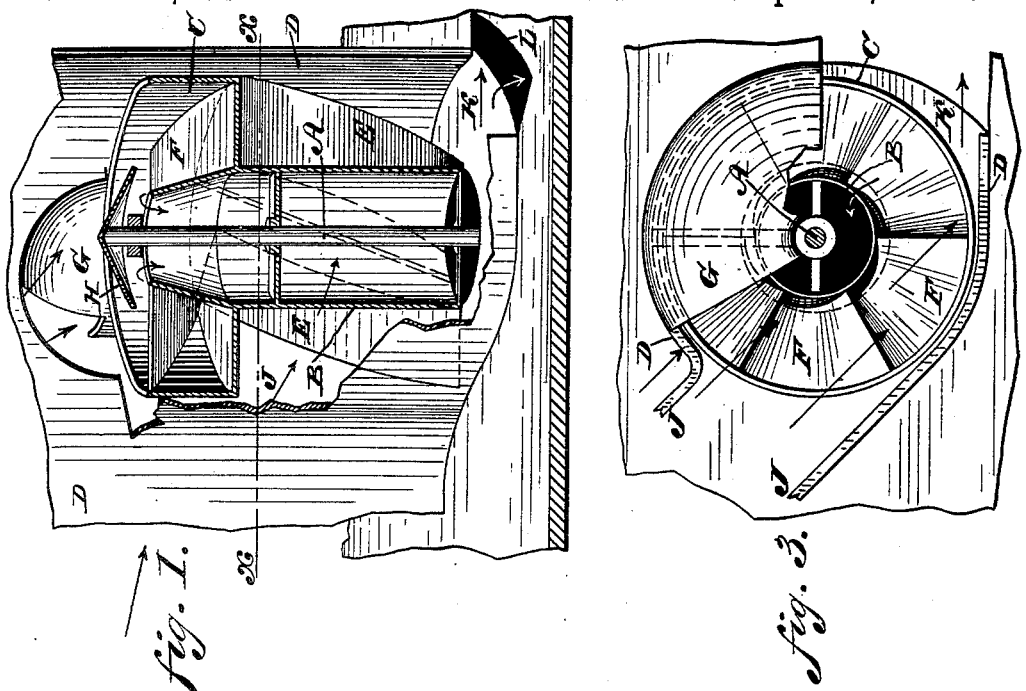
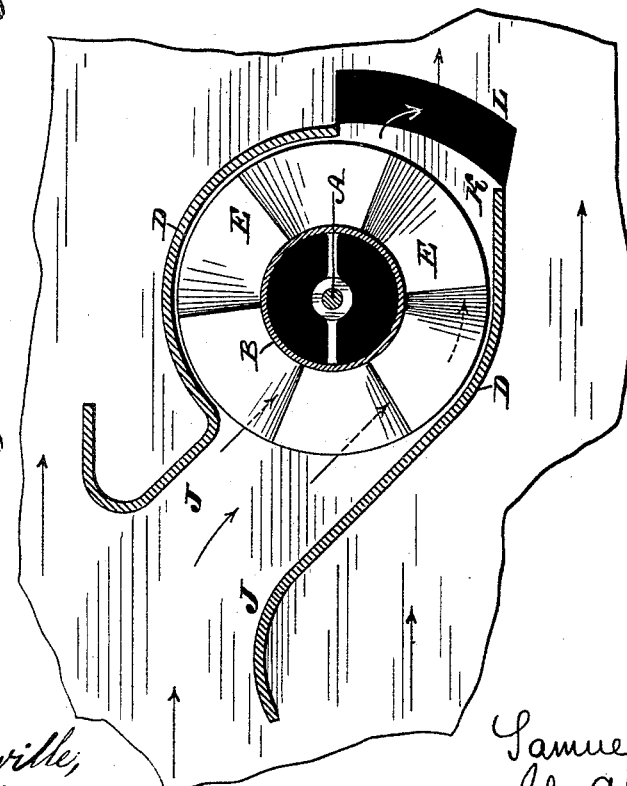
WITNESSES:
L. Douville
P. F. Eagle
INVENTOR:
Samuel B. Goff
BY John A. Wiedersheim
ATTORNEY.
THE NORRIS PETERS CO., PHOTO-LITHO., WASHINGTON, D. C.

(No Model.) 2 Sheets—Sheet 2.
S. B. GOFF.
WATER WHEEL OR MOTOR.
No. 426,262. Patented Apr. 22, 1890.
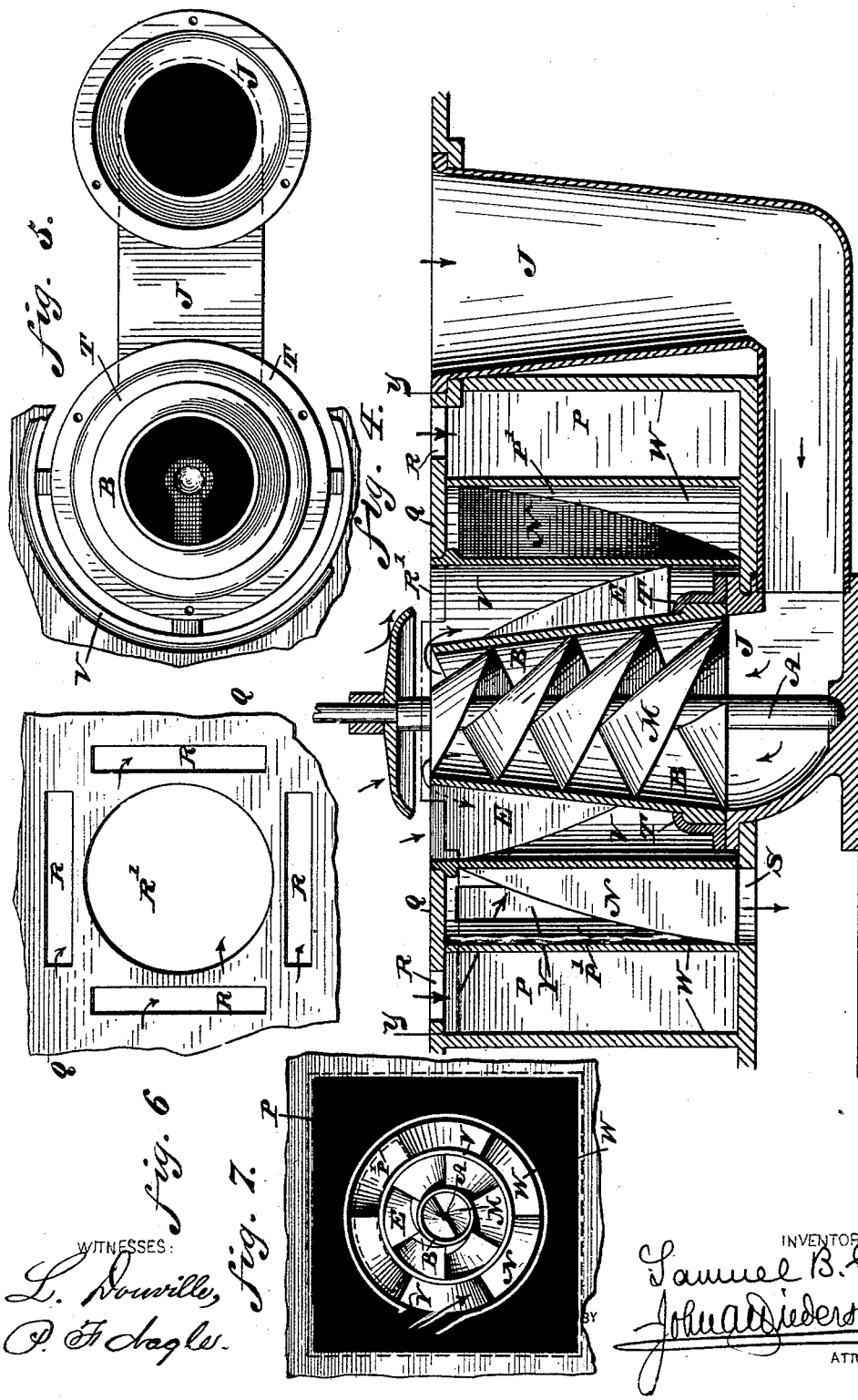
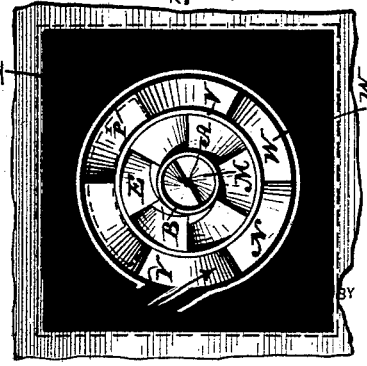
WITNESSES:
L. Douville,
P. F. Nagle.
INVENTOR
Samuel B. Goff.
BY John A. Wiedersheim
ATTORNEY.

UNITED STATES PATENT OFFICE.

SAMUEL B. GOFF, OF CAMDEN, NEW JERSEY.

WATER WHEEL OR MOTOR.

SPECIFICATION forming part of Letters Patent No. 426,262, dated April 22, 1890.

Application filed July 8, 1889. Serial No. 316,825. (No model.)

*To all whom it may concern:*

Be it known that I, SAMUEL B. GOFF, a citizen of the United States, residing in the city and county of Camden, State of New Jersey, have invented a new and useful Improvement in Water Wheels or Motors, which improvement is fully set forth in the following specification and accompanying drawings.

My invention relates to a water-wheel; and it consists in the novel construction and arrangement of the parts thereof, as will be more fully hereinafter set forth.

Figure 1 represents a sectional elevation of a water-wheel embodying my invention. Fig. 2 represents a horizontal section thereof on line $xx$, Fig. 1. Fig. 3 represents a top plan view thereof. Fig. 4 represents a sectional elevation of a water-wheel embodying my invention in a different form. Fig. 5 represents a top plan view of a part of the construction shown in Fig. 4. Fig. 6 represents a similar view of part of the device shown in Fig. 4. Fig. 7 represents a horizontal section on line $yy$ of Fig. 4.

Similar letters of reference indicate corresponding parts in the several figures.

Referring to the drawings, A designates a vertical shaft surrounded by a cylinder B, open at bottom and top and provided with an enlarged cylindrical head C. The said cylindrical head is partially covered by a hood G, and a deflector H is attached to the upper end of shaft A. A shell D incloses the said cylinder B and its head C, and is formed with a raceway J and an exit-opening K, arranged in proximity to an outflow drain or opening L. A series of spiral vanes E are attached to the cylinder B, and extend from the bottom thereof to the bottom plate of the head C. Between the side wall of the head C and the upper end of the cylinder B vanes F are arranged and secured to lie in a substantially-horizontal inclined position, as shown in Figs. 1, 2, and 3.

As shown in Figs. 4, 5, 6, and 7, the construction and arrangement of the parts is somewhat modified. In this instance the shaft A is surrounded by a screw-vane M, which is attached thereto and to a conical cylinder B. The bottom of said vane M is mounted over the water-way J, consisting of an elbowed pipe or conduit, as shown. A series of vanes E are connected to the outer side of the cylinder B and to the inner side of a cylinder V, surrounding said parts. Spiral vanes N are attached to the outer side of the cylinder V and rotate in one of the chambers of a surrounding cylinder W. The cylinder B rotates, and is beaded or flanged at its lower end and engaged at this point by a collar T. The cylinder V also revolves, and from the foregoing description it will be understood that all the parts between and including shaft A and cylinder V are connected and move simultaneously in the same direction. The cylinder W is divided into two circular chambers P and P', and is covered by a plate Q, (see Fig. 6,) which is formed with a series of elongated openings R, arranged over the outer chamber P. The said plate Q is also formed with a central circular opening R', which surrounds the outer top edge of cylinder V. In the wall between the chambers P and P' an ingress-opening Y is formed and the bottom of chamber P is constructed with an egress-opening S.

In the construction shown by Figs. 1, 2, and 3 one column of water enters the water-way J, strikes the vanes E, rides upward thereon and revolves the cylinder B and shaft A, and exits through opening K, and passes into the drain-opening L. At the same time an upper column of water may fall on the vanes F in the head C, and riding upward on said vanes accelerates the rotating speed of shaft A and flows over the top of cylinder B and down through the same. The hood G causes the upper column of water to strike the vanes at the proper point, and the deflector H prevents the water from flowing into the cylinder B before traversing the vanes F.

In the construction shown in Figs. 4, 5, 6, and 7 the water flows downward through the water-way J and is propelled upward through the screw-vane M and falls over the top of the cylinder B onto the vanes E and downward over the latter and through an exit-opening in cylinder V. The water falling on the plate Q passes through openings R into the chamber P, and from thence enters the chamber P' through the opening Y and strikes the vanes N. The pressure of the water against the vanes N increases the speed of rotation of the cylinder V and parts connected thereto, is increased, and an upward suction is established by the screw-vane M. The water from the chamber P' exits through opening S. The deflector H in this construction shields the screw-vane M from the retarding influence of a top pressure, as will be readily understood. Power may be taken from the shaft at any desired point.

Having thus described my invention, what I claim as new, and desire to secure by Letters Patent, is—

1. In a water-wheel, the combination of a shaft, a cylinder surrounding the same and connected thereto to form a water-way therewith, and having exterior vanes, an auxiliary driving-cylinder, a deflector on the shaft, and a hood arranged over said auxiliary cylinder, substantially as described.

2. A water-wheel having a central shaft, a cylinder thereon and having an enlarged head, vanes on the outer surface of the body of the cylinder, a hood partially covering said head, and a deflector attached to the upper end of the shaft, substantially as described.

3. A water-wheel having a central shaft, a cylinder thereon and having an enlarged head, vanes on the outer surface of the body of the cylinder, a hood partially covering said head, a shell inclosing said cylinder, and a raceway leading into said shell, said parts being combined substantially as described.

4. A water-wheel having a central shaft, a cylinder thereon having an enlarged head, vanes on the outer surface of the body of the cylinder, a hood partially covering said head, a shell inclosing said cylinder and having a raceway leading therein, and substantially horizontally-inclined vanes on said cylinder within said head, said parts being combined substantially as described.

SAMUEL B. GOFF.

Witnesses:
JOHN A. WIEDERSHEIM,
A. P. JENNINGS.